James A. Wilson   Inventor

By W.D. Heilman

Attorney

Oct. 20, 1959   J. A. WILSON   2,909,190
STATIC ELECTRICITY DETECTION AND CONTROL SYSTEM
Filed Oct. 29, 1958   4 Sheets-Sheet 3

James A. Wilson   Inventor
By W.O. J Heilman
Attorney

Oct. 20, 1959  J. A. WILSON  2,909,190
STATIC ELECTRICITY DETECTION AND CONTROL SYSTEM
Filed Oct. 29, 1958  4 Sheets-Sheet 4

James A. Wilson  Inventors
By W. D. T. Heilman  Attorney

United States Patent Office 2,909,190
Patented Oct. 20, 1959

2,909,190

STATIC ELECTRICITY DETECTION AND CONTROL SYSTEM

James A. Wilson, Stanhope, N.J., assignor to Esso Research and Engineering Company, a corporation of Delaware Application October 29, 1958, Serial No. 770,366

15 Claims. (Cl. 137—487.5)

This invention relates to a method and means for detecting the discharge of static electricity. It relates particularly to a method and means for detecting the discharge of static electricity within storage tanks at least partially filled with hydrocarbon liquids, and it relates more particularly to a method and means for generating a signal according to the discharge of static electricity within a storage tank at least partially filled with a hydrocarbon liquid and using this signal to regulate the flow of liquid in the line whereby this tank is filled.

During routine handling such as filling a storage tank, hydrocarbon liquids subject to agitation as by pumps and filters may accumulate static electric charges. For a detailed discussion of such accumulation and its significance with respect to methods and means for the handling of hydrocarbon liquids reference may be had to the book Electrostatics in the Petroleum Industry, edited by A. Klinkenberg and J. L. van der Minne, Elsevier Publishing Co., New York, 1958. For purposes of this invention it may be said that electrostatic charges in and on a hydrocarbon liquid body which is resident in and partially fills a storage tank will induce an electrostatic field in the liquid body and in the vapor space above the liquid. This field may be thought of as a pattern of lines of force running from the charges to the wall, bottom, and roof boundaries of the tank, and passing at right angles through a series of surfaces of constant potential. These are closed surfaces, some of which may exist wholly in the liquid body and others of which may exist partially in the liquid body and partially in the vapor space.

Strength of an electrostatic field is determined as the rate of change of potential per unit of distance as one moves through the field along a line of electrostatic force. Common units for expressing field strength are volts/in. and volts/cm. Any medium in which an electrostatic field exists will have a characteristic dielectric strength measured in units similar to those of field strength. For example, most gases at atmospheric pressure have a dielectric strength of approximately 30,000 volts/cm. When the electrostatic field strength at any point in a medium exceeds the dielectric strength thereof, electrostatic discharges will take place which, if sufficiently intense in a hydrocarbon vapor region, may cause sparking with attendant danger of explosion.

If low-level, sub-sparking electrostatic discharges could be detected in a storage tank being filled with a hydrocarbon liquid, safety conditions could be improved before the onset of sparking by shutting off the flow of liquid to the tank or at least reducing the rate thereof. In this way the supply of electrostatic charges to the liquid body in the tank would be stopped or slowed. Considering the charges already in the tank, it is characteristic of hydrocarbon liquids that if they be allowed to stand quiescently, as the greater amount of the liquid body in a storage tank will be standing even though there be an influent stream of fluid, electrostatic charges in them initially will tend to be dissipated by leakage to ground and field strengths to be reduced. This dissipation of charge goes on as a flow of current quite in the absence of any static sparking or sub-sparking discharge according to the "relaxation" principle which is discussed by Klinkenberg and van der Minne at page 39. The concept presently important, however, is simply that if flow of electrostatically charged fluid to a storage tank be so reduced that with respect to the liquid body in the tank the charging rate falls below the relaxation rate plus the static discharge rate there will be a net decrease of charge in the tank and an accompanying reduction in electrostatic field strengths.

According to this invention, radio means are provided whereby electrostatic discharges occurring inside a tank for the storage of hydrocarbon liquid materials may be detected, recorded, and particularly distinguished from electrostatic discharges taking place outside the tank. Means are provided further whereby the flow of liquids to the tank may be regulated according to the internal electrostatic discharge activity detected.

The nature and substance of this invention may be more clearly perceived and fully understood by referring to the following description and claims taken in connection with the accompanying drawings in which:

Figure 1:
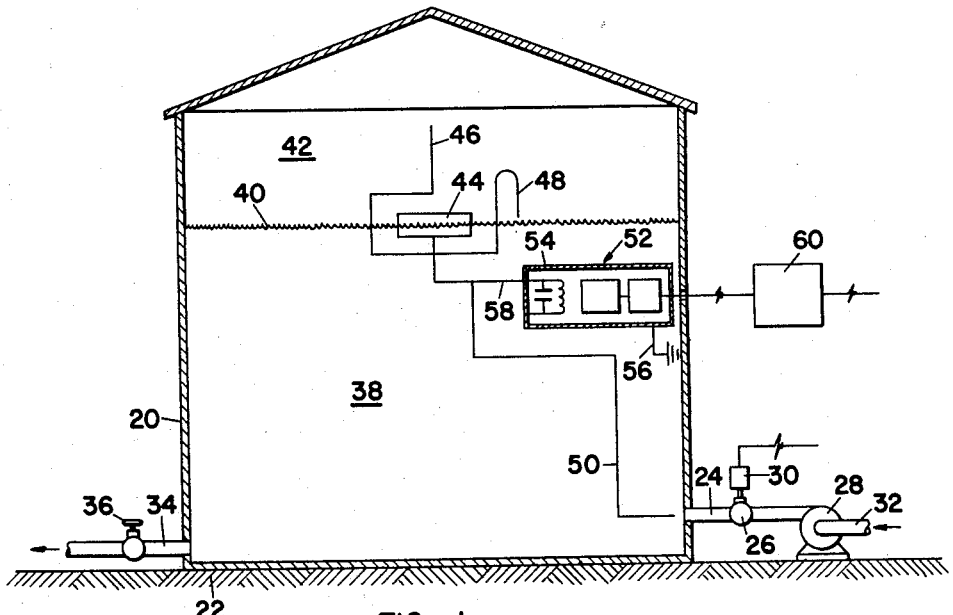
Fig. 1 represents a view in sectional elevation through a tank partially filled with a hydrocarbon liquid, and in which is located radio means for electrostatic discharge detection according to this invention.

Referring now to the drawings, in Fig. 1 a roofed tank adapted for the storage of hydrocarbon liquids is designated 20. This tank is supported by and electrically grounded to earth strata 22. The tank is provided with an inlet line 24 in which are located a flow control valve 26 and a centrifugal pump 28. Inlet flow control valve 26 is equipped with a power-driven actuating mechanism 30. The suction line to pump 28 is designated 32. Tank 20 also has a drain line 34 and an outlet flow control valve 36 in this line.

Within tank 20 there is a body of hydrocarbon liquid 38 having an upper free surface 40. Above surface 40 there is a vapor space 42. Supported buoyantly in the liquid at the surface thereof is a float member 44 which carries the antennae 46, 48 and 50 of one apparatus for detection of electrostatic discharges according to this invention. As shown, these antennae are intended respectively to be located primarily in the vapor space, in both liquid and vapor, and in the liquid. Any other appropriate antenna arrangement may be used, however. The antenna wires have a degree of flexibility, and suitable locating means not particularly illustrated are provided for maintaining the antennae in substantially the desired positions and configurations as float member 44 rises and falls with changes in level of liquid surface 40.

Mounted within tank 20 on appropriate supporting means not particularly designated is an electrostatic discharge detector apparatus 52 which comprises a sealed, explosion proof metal case 54 containing antenna coupler, radio receiver, and receiver output filter means which will be more completely described in connection with Fig. 2. Case 54 is grounded to the tank structure as by wire 56. Should detector apparatus 52 be supported from the structure of tank 20 by metal braces or brackets, the latter may serve as grounding means. The several antennae, all of which comprise wires with insulating coverings of suitable material such as polyethylene intended to prevent grounding of an antenna upon contact with tank structure, are joined in a common lead 58 running to the coupler while the leads from the receiver output filter are connected to a remote audio amplifier designated 60. The latter apparatus, intended to operate on signals generated inside the tank, will be more completely described in connection with Fig. 3.

Figure 2:
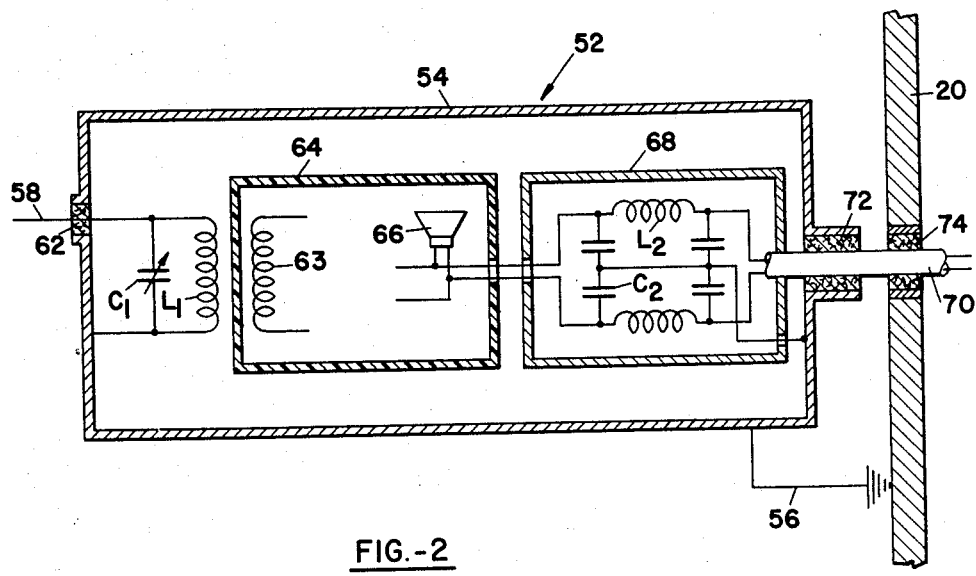
Fig. 2 represents a schematic diagram with details of sealing and shielding of a coupler, receiver, and filter apparatus suitable for use inside a hydrocarbon liquid storage tank for radio detection of electrostatic discharges according to this invention.

Referring now to Fig. 2, the common antenna lead 58 is brought into case 54 through a vapor and liquid seal 62 to the tuned antenna coupler comprising the parallel circuit of inductor $L_1$ and variable capacitor $C_1$. Inductor $L_1$ is closely coupled to coil 63 which is the antenna loop of a radio receiver circuit contained within housing 64. $L_1$ may in fact comprise a wire wrapping on housing 64. This housing and the circuit components within it may be simply any radio for standard broadcast reception, preferably one which is battery operated and employs transistors rather than vacuum tubes for the sake of compactness. Variable capacitor $C_1$ and the radio circuit may be tuned to couple at a frequency of about 1700 kc. corresponding to the approximate carrier frequency to be expected of radiant energy released by electrostatic discharges within the tank.

The radio circuit within housing 64 is characterized by a speaker 66. From the terminals of this speaker electrical connections are made to a filter section comprising four capacitors $C_2$ and two inductors $L_2$ located in a filter shield 68. The filter section limits stray static pickup in the output of detector 52. $C_2$ may be .001 mfd. and $L_2$ may be 2.5 mh. The output leads of the filter section are provided with suitable shielding 70, and the shielded cable so formed which may be rated at 2w. is taken out of case 54 through a vapor and liquid seal 72, and then out of tank 20 through another such seal 74.

Figure 3:
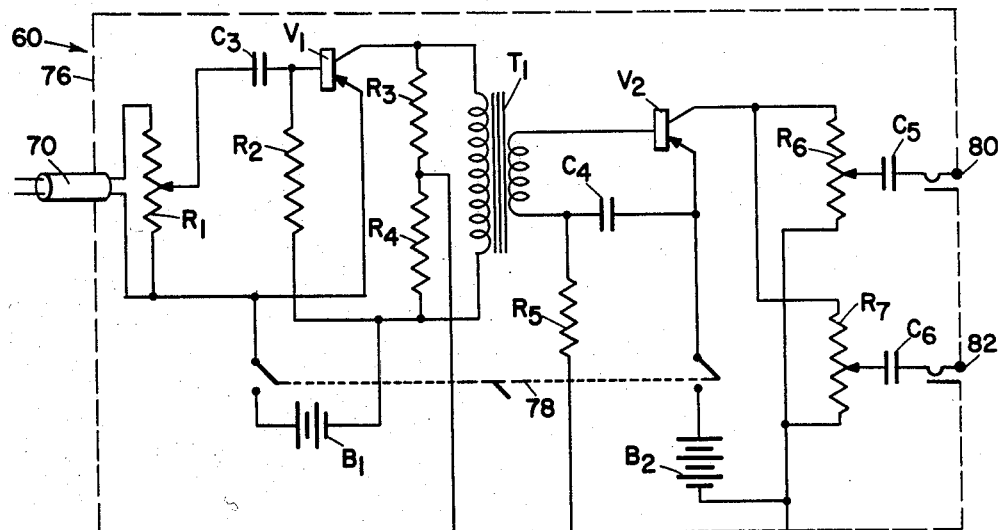
Fig. 3 represents a schematic diagram of a remote audio amplifier suitable for use with the coupler, receiver, and filter apparatus of Fig. 2.

Referring now to Fig. 3, the remote audio amplifier 60 comprises a metal case 76 containing an electrical circuit which may be as shown. This amplifier circuit is connected to the leads from the filter circuit of the detector brought to it inside shield 70. The off-on switch 78 of the amplifier, shown in dotted outline indicative of its function, is of the double pole, single throw variety. The output terminals 80 and 82 may be used respectively for a phone monitor and a recorder. Suitable values for the various circuit elements may be as follows: $R_1=1000$ k. ohms; $R_2=220$ k. ohms; $R_3=R_4=10$ k. ohms; $R_5=200$ k. ohms; $R_6=R_7=10$ k. ohms; $C_3=4$ mfd.; $C_4=8$ mfd.; $C_5=C_6=0.1$ mfd.; $B_1=1.5$ v.; $B_2=7.5$ v.; $T_1$ is an SO–3 type iron-core transformer, and $V_1$ and $V_2$ are type 2N107 transistors.

Audio amplifier 60 is referred to as an "inside" amplifier although it is located outside of tank 20. This designation relates to its function of amplifying signals from detector apparatus 52 which is sensitive to electrostatic discharges occurring inside the tank.

Figure 4:
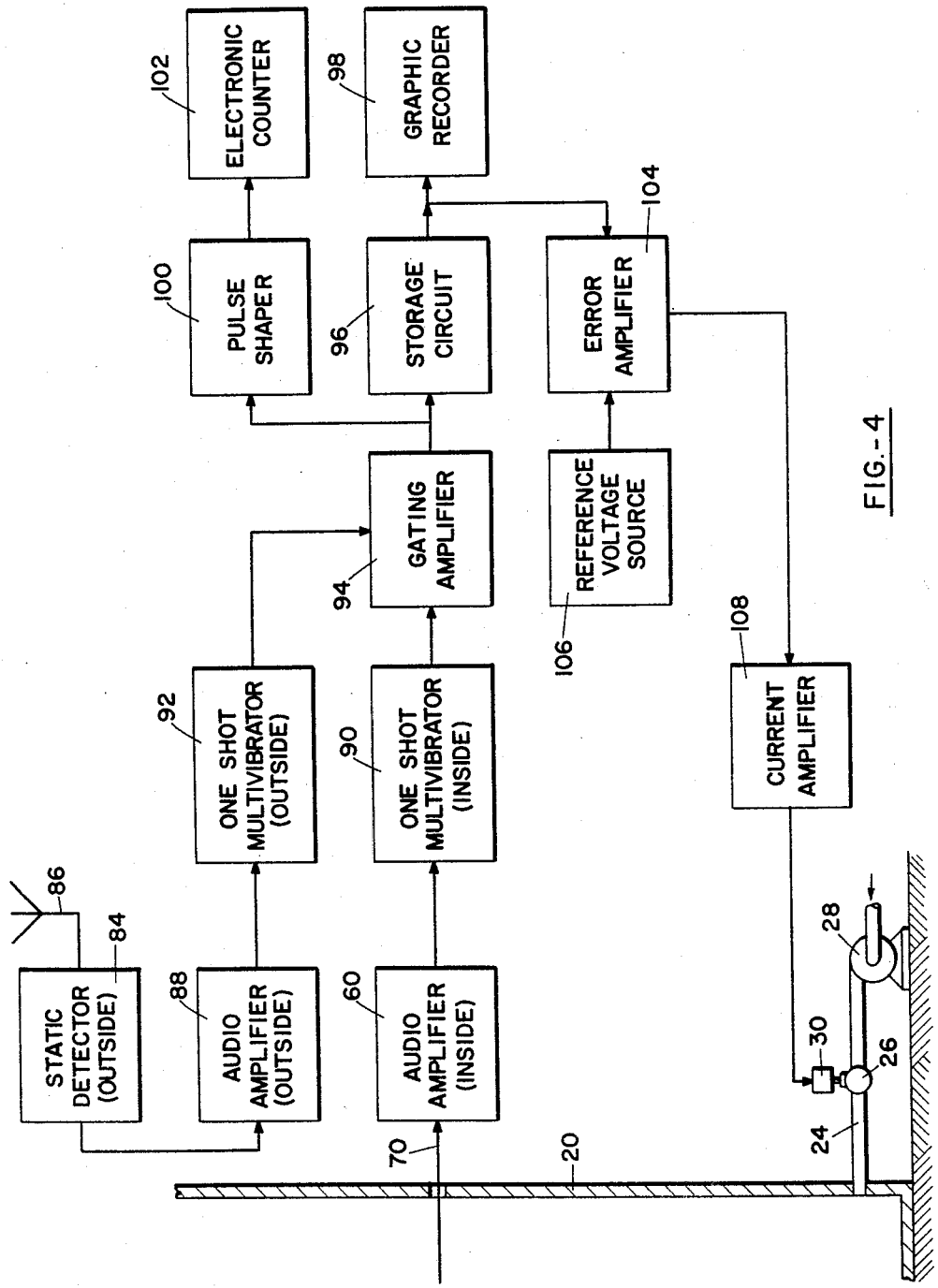
Fig. 4 represents a block diagram of the radio and other electrical apparatus continuing from a connection appearing in Fig. 1 whereby electrostatic discharges occurring inside the tank are distinguished from those taking place outside the tank and subsequently recorded, and whereby such distinguished discharges are employed to regulate the flow of liquid to the storage tank.

Referring now to Fig. 4, 84 designates an electrostatic discharge detector generally similar to detector 52 but located outside of tank 20. Detector 84 is provided with an antenna 86, likewise located altogether externally to tank 20. The output signal from detector 84 is taken to the outside audio amplifier 88 which is generally similar to amplifier 60. The audio frequency output signals from the inside and outside amplifiers 60 and 88 are impressed respectively on the inside and outside one shot multivibrators 90 and 92 which are relaxation oscillators, devices well known in the electronic art. Discrete signals from the audio amplifiers, representative of particular discharges of static electricity sensed by the detectors at or above a particular energy level, will trigger the multivibrators. Upon being triggered, each multivibrator will go through a single cycle of operation to give an output voltage signal.

Desirably the output signals from both multivibrators will be rectangular in form. It is necessary that the output signal from the inside multivibrator 90 be positive-going, and that from the outside multivibrator 92 be negative-going and of at least as great a negative peak value as that from multivibrator 90 is positive. It is necessary further that the duration of the signal from the outside multivibrator be of at least as great duration as that from the inside multivibrator, and desirably it will be somewhat longer. For example, the output signal duration for multivibrator 90 may be 0.5 millisecond while that from multivibrator 92 may be 1.0 millisecond. The several conditions of signal shape, direction, magnitude and duration may be satisfied through appropriate design of the multivibrators according to procedure well known in the electronics art.

For given designs of the static detectors 52 and 84 and the audio amplifiers 60 and 88, the strengths of the signals impressed on multivibrators 90 and 92 will be functions respectively of the energy levels of electrostatic discharges taking place inside and outside tank 20. At least a certain strength of signal leaving either audio amplifier will be needed to trigger the corresponding multivibrator. Signals from an audio amplifier of greater strength than this will not affect the signal output from the multivibrator, but audio amplifier output signals of less strength will fail to trigger the multivibrator at all. By suitable design of the detector, audio amplifier, and multivibrator systems, triggering of the multivibrators may be set to take place only when certain critical levels of energy release due to electrostatic discharges inside and outside of the tank are achieved or exceeded.

Signals from both multivibrators 90 and 92 are brought to gating amplifier 94. This amplifier which may be of a kind well known in the electronic art is, in effect, a circuit arranged to act as a gate with respect to an input signal in either passing or blocking this signal or an amplified version thereof. Customarily in a gating amplifier circuit there is a vacuum tube which must be in conducting condition for an input signal to be passed. This tube, which might otherwise be continuously conducting due to the construction of the amplifier, may be rendered non-conducting by imposition of a negative-going voltage on a suppressor grid element thereof. Such a negative-going voltage is sometimes called an inhibit voltage or signal. For purposes of this invention, gating amplifier 94 must function to either pass or block the positive-going signal reaching it from the inside multivibrator 90. The outside multivibrator 92 is, accordingly, so connected to the gating amplifier that its negative-going signal will act as an inhibit signal to prevent any signal from the inside multivibrator 90 or amplified version of such signal from being passed by amplifier 94.

The reason for the arrangement just described is that it is desired to have output signals from gating amplifier 94 which correspond only to electrostatic discharges taking place within tank 20. Electrostatic discharges due to uncontrollable causes may be expected to be taking place continuously outside of tank 20. The radiant energy of some such discharges, though greatly attenuated by the walls of tank 20 and the grounded metal detector case 54, may be picked up by the external antenna system and internal loop 63 of the inside detector 52 and result in signals from the inside multivibrator 90 being impressed on gating amplifier 94. If these signals or amplified versions thereof were not blocked by the gating amplifier, the output of this amplifier would include signals corresponding not only to electrostatic discharges taking place inside the tank, but also to some taking place outside the tank. By imposing on the gating amplifier as inhibit signals voltages corresponding to electrostatic discharges external to the tank, the gating amplifier will never be "open" to pass a signal from the inside multivibrator 90 when this signal is due to an electrostatic discharge taking place outside the tank. Therefore, the output of gating amplifier 94 will comprise only signals due to electrostatic discharges occurring inside the tank.

The possibility exists that an electrostatic discharge taking place inside the tank will coincide with one taking place outside, and both be of sufficient energy level as picked up by the antenna systems of detectors 52 and 84 to result in triggering of both multivibrators simultaneously. In this case the gating amplifier will block the signal reaching it from the inside multivibrator 90, and no signal corresponding to the electrostatic discharge inside the tank will appear in the output of gating amplifier 94. Statistically, however, the possibility of such coincidence of electrostatic discharges inside and outside the tank is slight, and it is contemplated that very few electrostatic discharges occurring inside the tank at sufficient energy level to cause triggering of multivibrator 90 will fail to appear as output signals from the gating amplifier.

Another theoretical possibility is that the outside detector 84 will pick up signals due to electrostatic discharges taking place inside the tank, which if suitably amplified could cause triggering of multivibrator 92 and so always have gating amplifier 94 closed against any signal reaching it from multivibrator 90. In this way the gating amplifier would have no output at all. In practice this possibility can be kept from ever becoming an actuality by proper design of the outside static detector 84, audio amplifier 88, and multivibrator 92 with respect to the energy level of signals likely to be picked up by antenna 86 of detector 84. Any signal picked up by antenna 86 which is due to an electrostatic discharge inside the tank will be at a very low energy level if for no other reason than that the attenuation of it by passage through the walls and roof of tank 20.

Accordingly if detector 84, amplifier 88, and multivibrator 92 be so designed that there will be no triggering of multivibrator 92 by any signal picked up by antenna 86 at an energy level corresponding to that of an electrostatic discharge within the tank as attenuated by the tank structure, there will be no actual possibility of these discharges within the tank being self-suppressing with respect to output signals from the gating amplifier 94. Such a design consideration will not be inconsistent with the requirement that the outside multivibrator 92 be triggered by electrostatic discharges occurring outside of tank 20 since such discharges are likely to be at a considerably higher energy level than those inside, and in respect to antenna 86 there will be no attenuation of the radiant energy of these discharges by the tank structure.

Output signals from gating amplifier 94 flow to storage circuit 96. This circuit comprises a capacitor and a rectifier element. The capacitor is charged by signals of a pulse nature reaching it from gating amplifier 94. It will discharge to give an analog signal representing an average of the pulse input per unit time. The capacitor of storage circuit 96 is, in effect, an integrating device. The rectifier element of storage circuit 96 is so installed to prevent the backflow of any signal from the storage circuit to the gating amplifier as the storage circuit capacitor discharges. The rectifier element is thus a one-way isolating device between the gating amplifier and the storage circuit capacitor.

Storage circuit 96 should be designed with a sufficiently high time constant, 1.0 sec. for example, that it will give a continuous direct voltage output signal for any substantial input rate of pulse signals from the gating amplifier. The magnitude of this output voltage will vary directly with the pulse frequency of the gating amplifier output. The output voltage from storage circuit 96 may be impressed on any suitable graphic recorder 98. The record made therein will be a significant indicator of electrostatic discharge activity of at least a certain energy level within storage tank 20.

It may be desired to obtain an actual count of the electrostatic discharges at or above a certain energy level taking place within tank 20. This can be done by means of pulse shaper 100 and an electronic counter 102. The pulse shaper will receive output pulse signals of substantially rectangular form from gating amplifier 94 and perform a differentiating operation on the leading edges of these pulses to produce corresponding signals of spike form as its own output. These spike signals will be impressed on and actuate counter 102 which may be of the decade type well known in the electronic art.

The direct voltage output from storage circuit 96 goes not only to graphic recorder 98, but also to error amplifier 104 which is an essential element of the control system whereby the filling rate of tank 20 is regulated according to this invention. The function of the error amplifier is to compare the voltage impressed on it from storage circuit 96 on the one hand, and a reference voltage source 106 on the other and to amplify any difference between these voltages, this difference being known as error. The amplified error voltage signal comprising the output of amplifier 104 will be at a comparatively low power level, and generally incapable of performing control operations itself. It is, accordingly, taken to a current amplifier 108 and there raised to such power level that the output signal of amplifier 108 is a direct current of magnitude sufficient to energize the actuating mechanism 30 of inlet flow control valve 26. This mechanism may comprise a direct current motor geared or otherwise operatively connected to the stem of valve 26.

There will be some level of electrostatic discharge activity in tank 20 which will correspond to a safe upper level of potential gradients induced in vapor space 42 by electrostatic charges in the liquid body 38. This level of electrostatic discharge activity, as indicated by the magnitude of the direct voltage output of storage circuit 96, must be determined by independent experiment and calculation. Once determined, however, it becomes the value of voltage to be impressed on error amplifier 104 from reference voltage source 106.

The error voltage signal comprising the output of error amplifier 104 will have direction as well as magnitude. It will have one direction if the reference voltage exceeds the output voltage of storage circuit 96 and vice versa. The direction of the error voltage will determine the direction of control current supplied to the motor of valve actuating mechanism 30 from current amplifier 108. A required condition is that when the output voltage of storage circuit 96 exceeds the reference voltage the motor of actuating mechanism 30 must turn to close valve 26 and so restrict flow to tank 20. Correspondingly, when reference voltage exceeds the output voltage of storage circuit 96 the motor of actuating mechanism 30 should turn to open the valve. Such devices as limit stop switches or slip clutches may be provided to protect the motor from continuing to drive when valve 26 is fully open or fully closed.

Imagine that a hydrocarbon liquid is being supplied to tank 20 by pump 28 through line 24 and valve 26 which is at least part way open. Imagine further that the electrostatic discharge activity in tank 20 so increases that the output voltage from storage circuit 96 exceeds the voltage from reference voltage source 106. Actuating mechanism 30 will commence closing valve 26 and reducing the rate of flow of oil to tank 20. The rate of electrostatic charge inflow to tank 20 will be reduced simultaneously. In the meanwhile, continuous dissipation or relaxation of charges in the body of liquid 38 already in the tank by current to ground will be going on. Total charge dissipation rate by relaxation and static discharge will eventually come to exceed charge inflow rate, and when this happens the electrostatic discharge activity in tank 20 will begin to decline.

This activity will continue to decline as valve 26 closes, or possibly goes entirely closed, and with it will decline the output voltage of storage circuit 96. When this voltage has fallen to the magnitude of the reference voltage, a value corresponding to a safe level of electrostatic discharge activity in tank 20, there will be no further error signal from error amplifier 104 and no further current to energize the motor of valve actuating mechanism 30. Closing motion of valve 26 will be terminated. Now if the electrostatic discharge activity in tank 20 continues to decline, the voltage from storage circuit 96 will fall below the reference voltage; the motor of actuating mechanism 30 will be energized to open valve 26, and the rate of oil flow to tank 20 allowed to increase. The flow control system will try continuously to maintain an oil supply rate to tank 20 whenever the tank is to be filled by pump 28 such that a balance is reached between charge inflow to the tank and charge dissipation from the tank at the maximum safe level of electrostatic discharge activity within the tank.

Figure 5:
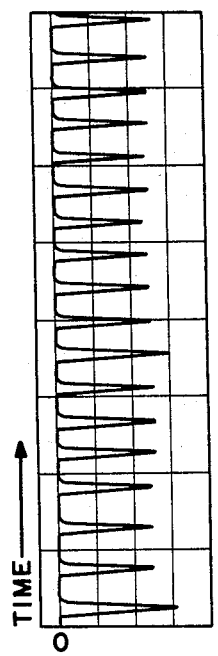
Fig. 5 represents a graphic recording of electrostatic discharges across a calibrated spark gap from a direct current power supply.
Figure 7:
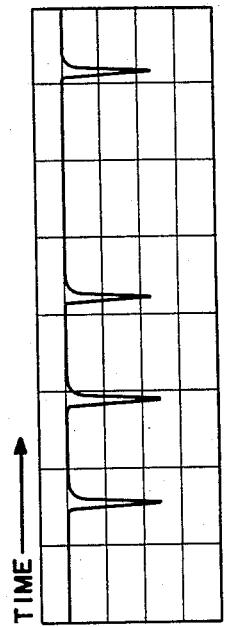
Fig. 7 represents a graphic recording of electrostatic discharges occurring during the pumping of JP-4 fuel over sulfur in the laboratory pumping test apparatus of Fig. 6.

Referring now to Fig. 5, the electrostatic discharge graphic record shown as a reference for comparison with Fig. 7, is that taken across a calibrated spark gap set to fire at 7,000 volts from a direct current power supply. The amount of energy stored in the system before firing was approximately 12.0 millijoules. The graphic ordinate of time indicates the advance of the chart paper. The graphic abscissa of voltage, while not described quantitatively and being immediately representative of the signal potential impressed on the recording device by the radio frequency electrostatic discharge detecting apparatus, indicates the relative energy levels of spark gap discharges for each firing of the particular system as picked up by the detecting apparatus.

Figure 6:
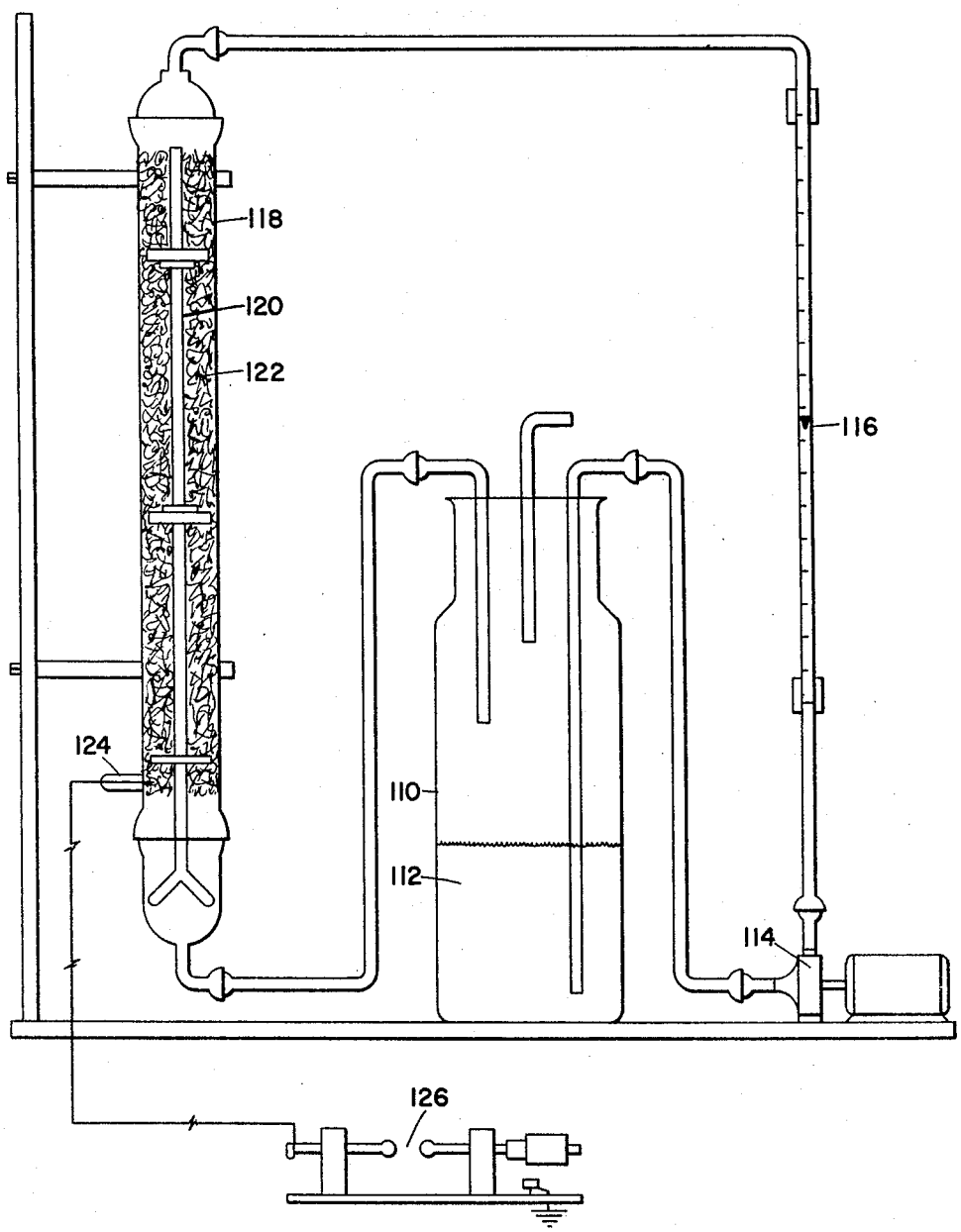
Fig. 6 represents a laboratory pumping test apparatus for generating electrostatic charges in hydrocarbon liquids and discharging them across a spark gap.

Referring now to Fig. 6, a typical laboratory pumping test apparatus for generation of static charges in hydrocarbon liquids, and means for firing these charges are shown. A reservoir 110 contains a hydrocarbon liquid body 112. By means of a suction line descending well into the reservoir, liquid is drawn into motor-driven pump 114 which discharges it through rotameter 116. From the rotameter the pumped liquid flows to and through a glass pipe 118. Within pipe 118 there is a rack 120 also of glass which supports a body of material 122 such as glass wool used in filters or lumps of sulfur representing substance found in tank scale. From the outer end of the glass pipe the liquid is returned to reservoir 110. Intermediate connecting tubing runs and fittings and the support structure as well as pipe 118 are of electrically non-conductive material such as glass or Lucite.

A tungsten probe 124 penetrates pipe 118 and is in contact with the lower end of the filling material 122. This probe is wired to one side of an adjustable spark gap 126, the other side of which is connected to ground. Electrostatic discharge detecting means such as that described earlier with suitable graphic recording apparatus attached is positioned adjacent the spark gap. When pump 116 is operated there will be agitation of the liquid by the pump itself and filling material 122 with consequent generation and accumulation of charge in the liquid. This accumulated charge will be picked up by probe 124 and a potential developed across spark gap 126. From time to time a breakdown potential will be achieved and the gap be fired. The electrostatic discharge detecting and recording apparatus will then function in a manner generally described already.

Referring now to Fig. 7, what is shown is an electrostatic discharge record of JP-4 fuel pumped in the apparatus of Fig. 6 using a filling of lump sulfur in pipe 118. The voltage trace of Fig. 7 was, in fact made with the same spark gap, radio detector, and graphic recorder apparatus used in preparation of Fig. 5, although, of course, at a different time. Evaluating these records in terms of tank storage of hydrocarbon liquids discussed earlier, Fig. 5 developed from spark equipment using a direct current power supply might be pictured as the external interference signal while Fig. 7 with Fig. 5 added at some attenuated energy level would then represent a typical composite signal of electrostatic discharges sensed by radio frequency detecting apparatus located within a tank as detector 52 and its antennae within tank 20.

Although this invention has been described with a certain degree of particularity, it is to be understood that the present disclosure has been made only by way of example and that numerous changes in the details of construction and the combination and arrangement of parts may be resorted to without departing from the spirit and scope of this invention as hereinafter claimed.

What is claimed is:

1. In combination with a vessel for the storage of liquid materials and conduit means communicating with said vessel wherethrough liquid material may be introduced into said vessel, an apparatus for control of electrostatic discharges within said vessel comprising radio means characterized by pick-up antenna means disposed within said vessel whereby electrostatic discharges occurring within said vessel may be detected and signals corresponding to said discharges generated for further transmission, a reference signal source, comparator means whereby signals from said radio means and said reference signal source may be matched and a differential signal generated for further transmission, transmission means connecting said radio means and said comparator means, transmission means connecting said reference signal source and said comparator means, liquid flow regulating means in said conduit, and transmission means connecting said comparator means and said liquid flow regulating means whereby said differential signal is imposed on said liquid flow regulating means.

2. An apparatus according to claim 1 in which said liquid flow regulating means comprises a valve having an electrically actuated opening and closing means.

3. An apparatus according to claim 2 in which said electrically actuated opening and closing means comprises a direct current motor.

4. An apparatus according to claim 1 including a current amplifying means whereby said differential signal from said comparator means is raised in power level prior to imposition upon said liquid flow regulating means.

5. In combination with a vessel for the storage of liquid materials and conduit means communicating with said vessel wherethrough liquid material may be introduced into said vessel, an apparatus for controlling electrostatic discharges within said vessel comprising a first radio means inside said vessel whereby electrostatic discharges occurring within said vessel may be detected and signals corresponding to said discharges generated for further transmission, a second radio means outside of said vessel whereby electrostatic discharges occurring without said vessel may be detected and signals corresponding to said discharges generated for further transmission, a gating means adapted to receive signals from said first and second radio means and to generate signals for further transmission corresponding only to those signals from said first radio means which correspond in turn only to those electrostatic discharges occurring within said vessel non-coincidentally with electrostatic discharges occurring without said vessel and for which corresponding signals are generated by said second radio means, transmission means connecting said first radio means and said gating means, transmission means connecting said second radio means and said gating means, a reference signal source, comparator means whereby signals from said gating means and said reference signal source may be matched and a differential signal generated for further transmission, transmission means connecting said gating means and said comparator means, transmission means connecting said reference signal source and said comparator means, liquid flow regulating means in said conduit, and transmission means connecting said comparator means and said liquid flow regulating means whereby said differential signal is imposed on said liquid flow regulating means.

6. An apparatus according to claim 5 in which said liquid flow regulating means comprises a valve having an electrically actuated opening and closing means.

7. An apparatus according to claim 6 in which said electrically actuated opening and closing means comprises a direct current motor.

8. An apparatus according to claim 5 including a current amplifying means whereby said differential signal from said comparator means is raised in power level prior to imposition upon said liquid flow regulating means.

9. In combination with a vessel for the storage of liquid materials and conduit means communicating with said vessel wherethrough liquid material may be introduced into said vessel, an apparatus for control of electrostatic discharges within said vessel comprising a first radio means inside said vessel whereby electrostatic discharges occurring within said vessel may be detected and signals corresponding to said discharges generated for further transmission, a second radio means outside of said vessel whereby electrostatic discharges occurring without said vessel may be detected and signals corresponding to said discharges generated for further transmission, a first multivibrator adapted to receive signals from said first radio means and generate pulse signals for further transmission corresponding to signals at or above a first predetermined energy level received from said first radio means, a second multivibrator adapted to receive signals from said second radio means and generate pulse signals for further transmission corresponding to signals at or above a second predetermined energy level received from said second radio means, transmission means connecting said first radio means and said first multivibrator, transmission means connecting said second radio means and said second multivibrator, a gating means adapted to receive signals from said first and second multivibrators and to generate pulse signals for further transmission corresponding only to those signals from said first multivibrator which correspond in turn to those signals from said first radio means which finally correspond only to those electrostatic discharges occurring within said vessel non-coincidentally with electrostatic discharges occurring without said vessel and detected and for which corresponding signals resulting in output pulses from said second multivibrator are generated by said second radio means, transmission means connecting said first multivibrator and said gating means, transmission means connecting said second multivibrator and said gating means, a storage means adapted to receive pulse signals from said gating means and to generate a signal for further transmission corresponding to a time-integrated value of pulse signals received from said gating means, transmission means connecting said gating means and said storage means, a reference signal source, a comparator means whereby signals from said storage means and said reference signal source may be matched and a differential signal generated for further transmission, transmission means connecting said storage means and said comparator means, transmission means connecting said reference signal source and said comparator means, liquid flow regulating means in said conduit, and transmission means connecting said comparator means and said liquid flow regulating means whereby said differential signal is imposed on said liquid flow regulating means.

10. An apparatus according to claim 9 in which said liquid flow regulating means comprises a valve having electrically actuated opening and closing means.

11. An apparatus according to claim 10 in which said electrically actuated opening and closing means comprises a direct current motor.

12. An apparatus according to claim 9 including a current amplifying means whereby said differential signal from said comparator means is raised in power level prior to imposition upon said liquid flow regulating means.

13. An apparatus according to claim 9 including amplifying means associated with each of said first and second radio means whereby audio frequency output signals from said radio means are amplified prior to transmission to said first and second multivibrators respectively.

14. An apparatus according to claim 9 including graphic recording means actuated by output signals from said storage means.

15. An apparatus according to claim 9 including pulse counting means actuated by output signals from said gating means.

References Cited in the file of this patent

Electrical Engineering (AIEE), vol. 77, No. 7, July 1958, "Static Electricity in the Petroleum Industry," pp. 610–614), 317–2. (Copy in Scientific Library.)